Dec. 23, 1924.
J. KANDARIAN
ADJUSTABLE VALVE AND SPRING
Filed Feb. 12, 1923
1,520,575
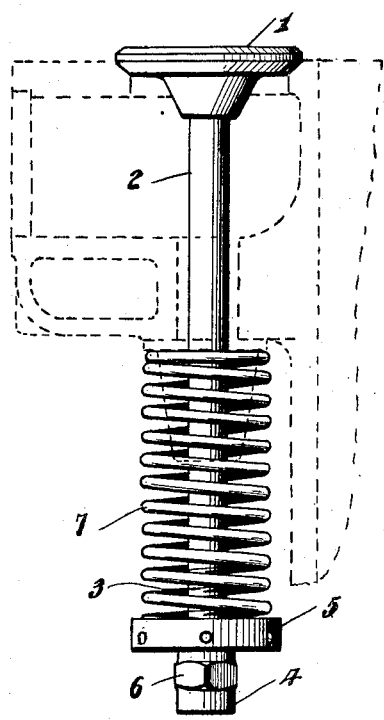
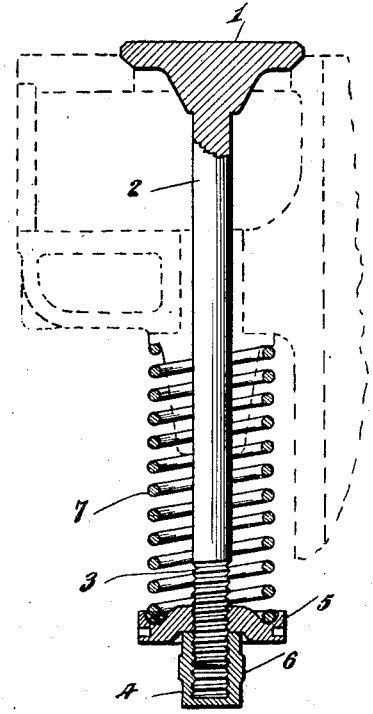
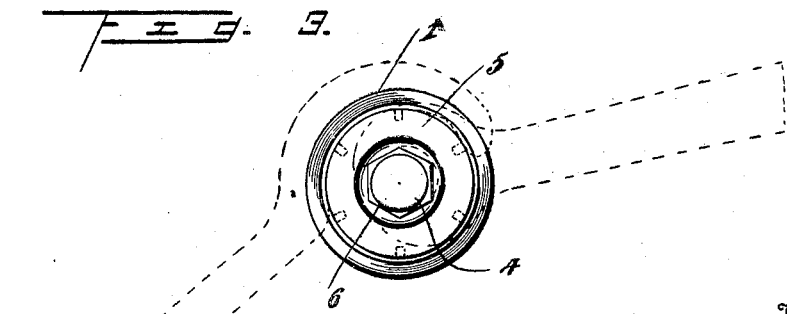
Inventor
J. Kandarian.
By
Attorney Patented Dec. 23, 1924.

1,520,575

UNITED STATES PATENT OFFICE.

JOHN KANDARIAN, OF PROVIDENCE, RHODE ISLAND.

ADJUSTABLE VALVE AND SPRING.

Application filed February 12, 1923. Serial No. 618,551.

*To all whom it may concern:*

Be it known that I, JOHN KANDARIAN, a citizen of the United States, residing at Providence, in the county of Providence and State of Rhode Island, have invented certain new and useful Improvements in Adjustable Valves and Springs; and I do hereby declare the following to be a full, clear, and exact description of the invention, such as will enable others skilled in the art to which it appertains to make and use the same.

The invention has relation to a valve for internal combustion engines of the type operable from below by means of a push rod and cam shaft, and has for its object the provision of means whereby the stem of the valve may be adjusted to insure a firm seating of the valve and a maximum opening when the valve is unseated and at the same time to insure a proper spacing between the push rod and valve stem to obviate clatter when the engine is in operation.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a view in elevation of a valve of the type aforesaid embodying the invention, Figure 2 is a similar view partly in section, and Figure 3 is a view of the valve as seen from the lower end, the dotted lines showing wrenches in cooperative relation with the valve seat and the cap nut.

Corresponding and like parts are referred to in the following description and designated in the several views of the drawings by like reference characters.

The valve shown comprises a head 1 and stem 2 and in the preferable construction these parts are of integral formation to obviate the formation of a joint and preclude the blowing off or detachment of the head from the stem. The lower end of the stem 2 is threaded for a short distance, as indicated at 3, and receives a cap nut 4 and valve spring seat 5. The cap nut 4 is provided with a polygonal portion 6 to receive a wrench, as indicated by the dotted lines in Figure 3, whereby to hold the cap nut in the required adjusted position when turning the valve spring seat 5 to bindingly engage the cap nut and secure it in the adjusted position. The valve spring seat 5 consists of a disk having openings in its edge to receive a spanner, as indicated by the dotted lines in Figure 3, whereby to rotate the part and lock it by means of the cap nut 4 and prevent displacement thereof. The lower side of the seat 5 is centrally recessed to receive the upper end of the cap nut 4 and the outer portion of the top side is recessed to receive the lower end of the spring 7, whereby to center the same with reference to the stem 2.

It will be understood from the foregoing that the usual pin and washer cooperating with the valve stem are dispensed with and the stem may be adjusted with reference to the push rod so that the valve may close squarely upon its seat and a proper space being provided between the push rod and valve stem to prevent clatter and unusual noise in the operation of the valve when the engine is running.

What is claimed is:

An internal combustion engine valve of the type adapted for manual adjustment while the engine is assembled, said valve having a head at the upper end and a stem provided with screw threads at its lower end portion, a valve-spring seat threaded upon said portion and engageable by a spring from above, and a cap screw-threaded upon said portion to serve as a lock for the seat and to vary its position with respect to the operating means for the valve, said cap being closed at its lower end for engagement by the last mentioned means.

In testimony whereof I affix my signature in presence of a witness.

JOHN KANDARIAN.

Witness:
BENNETT S. JONES.